US009790362B2

(12) United States Patent
Kwon et al.

(10) Patent No.: US 9,790,362 B2
(45) Date of Patent: Oct. 17, 2017

(54) THERMOPLASTIC RESIN COMPOSITION AND MOLDED ARTICLE MADE USING THE SAME

(71) Applicant: Samsung SDI Co., Ltd., Yongin-si (KR)

(72) Inventors: Keehae Kwon, Uiwang-si (KR); Won Ko, Uiwang-si (KR); Boeun Kim, Uiwang-si (KR); Joohyun Jang, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/750,364

(22) Filed: Jun. 25, 2015

(65) Prior Publication Data

US 2015/0376403 A1    Dec. 31, 2015

(30) Foreign Application Priority Data

Jun. 27, 2014  (KR) .................. 10-2014-0079920
Jun. 16, 2015  (KR) .................. 10-2015-0085365

(51) Int. Cl.
C08L 69/00    (2006.01)

(52) U.S. Cl.
CPC .................. C08L 69/00 (2013.01)

(58) Field of Classification Search
CPC .................. C08L 69/00; C08G 77/442
See application file for complete search history.

(56) References Cited

U.S. PATENT DOCUMENTS

| | | | |
|---|---|---|---|
| 3,322,853 A | 5/1967 | Trementozzi et al. |
| 3,742,092 A | 6/1973 | Duke et al. |
| 3,839,513 A | 10/1974 | Patel |
| 3,898,300 A | 8/1975 | Hillard |
| 4,027,073 A | 5/1977 | Clark |
| 4,045,514 A | 8/1977 | Iwahashi et al. |
| 4,062,909 A | 12/1977 | Morgan et al. |
| 4,102,853 A | 7/1978 | Kawamura et al. |
| 4,117,041 A | 9/1978 | Guschl |
| 4,287,315 A | 9/1981 | Meyer et al. |
| 4,303,772 A | 12/1981 | Novicky |
| 4,391,935 A | 7/1983 | Bialous et al. |
| 4,400,333 A | 8/1983 | Neefe |
| 4,460,742 A | 7/1984 | Kishida et al. |
| 4,466,912 A | 8/1984 | Phillips et al. |
| 4,632,946 A | 12/1986 | Muench et al. |
| 4,634,734 A | 1/1987 | Hambrecht et al. |
| 4,652,614 A | 3/1987 | Eichenauer et al. |
| 4,659,790 A | 4/1987 | Shimozato et al. |
| 4,668,737 A | 5/1987 | Eichenauer et al. |
| 4,692,488 A | 9/1987 | Kress et al. |
| 4,745,029 A | 5/1988 | Kambour |
| 4,757,109 A | 7/1988 | Kishida et al. |
| 4,883,835 A | 11/1989 | Buysch et al. |
| 4,906,696 A | 3/1990 | Fischer et al. |
| 4,914,144 A | 4/1990 | Muehlbach et al. |
| 4,918,159 A | 4/1990 | Nakamura et al. |
| 4,983,658 A | 1/1991 | Kress et al. |
| 4,988,748 A | 1/1991 | Fuhr et al. |
| 4,997,883 A | 3/1991 | Fischer et al. |
| 5,025,066 A | 6/1991 | DeRudder et al. |
| 5,061,558 A | 10/1991 | Fischer et al. |
| 5,061,745 A | 10/1991 | Wittmann et al. |
| 5,091,470 A | 2/1992 | Wolsink et al. |
| 5,200,492 A | 4/1993 | Ohnaga et al. |
| 5,204,394 A | 4/1993 | Gosens et al. |
| 5,206,404 A | 4/1993 | Gunkel et al. |
| 5,218,030 A | 6/1993 | Katayose et al. |
| 5,219,907 A | 6/1993 | Niessner et al. |
| 5,229,443 A | 7/1993 | Wroczynski |
| 5,237,004 A | 8/1993 | Wu et al. |
| 5,239,001 A | 8/1993 | Fischer et al. |
| 5,274,031 A | 12/1993 | Eichenauer et al. |
| 5,280,070 A | 1/1994 | Drzewinski et al. |
| 5,284,916 A | 2/1994 | Drzewinski |
| 5,292,809 A | 3/1994 | Drzewinski et al. |
| 5,306,778 A | 4/1994 | Ishida et al. |
| 5,354,796 A | 10/1994 | Creecy et al. |
| 5,412,036 A | 5/1995 | Traugott et al. |
| 5,446,103 A | 8/1995 | Traugott et al. |
| 5,449,557 A | 9/1995 | Liebler et al. |
| 5,451,650 A | 9/1995 | Siol et al. |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 dated Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).

(Continued)

Primary Examiner — Kuo-Liang Peng
(74) Attorney, Agent, or Firm — Additon, Higgins & Pendleton, P.A.

(57) ABSTRACT

A thermoplastic resin composition comprises (A) a polycarbonate resin; (B) a rubber-modified aromatic vinyl copolymer; (C) a branched copolymer that includes a silicon compound having two or more unsaturated radicals; and (D) metal particles. A molded product can be prepared using the composition.

18 Claims, No Drawings

(56) References Cited

U.S. PATENT DOCUMENTS

| | | |
|---|---|---|
| 5,473,019 A | 12/1995 | Siol et al. |
| 5,475,053 A | 12/1995 | Niessner et al. |
| 5,574,099 A | 11/1996 | Nora et al. |
| 5,605,962 A | 2/1997 | Suzuki et al. |
| 5,627,228 A | 5/1997 | Kobayashi |
| 5,635,565 A | 6/1997 | Miyajima et al. |
| 5,643,981 A | 7/1997 | Yang et al. |
| 5,672,645 A | 9/1997 | Eckel et al. |
| 5,731,390 A | 3/1998 | van Helmond et al. |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Madera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,423,767 B1 | 7/2002 | Weber et al. |
| 6,437,029 B1 | 8/2002 | Lim et al. |
| 6,528,559 B1 | 3/2003 | Nakacho et al. |
| 6,528,561 B1 | 3/2003 | Lobel et al. |
| 6,566,428 B1 | 5/2003 | Ecket et al. |
| 6,576,161 B2 | 6/2003 | Lim et al. |
| 6,595,825 B1 | 7/2003 | De Wilde |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 8,557,912 B2 | 10/2013 | Chung et al. |
| 8,735,490 B2 | 5/2014 | Chung et al. |
| 9,090,767 B2 | 7/2015 | Park et al. |
| 9,365,671 B2 | 6/2016 | Kim et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0115794 A1 | 8/2002 | Singh et al. |
| 2002/0151624 A1 | 10/2002 | Kobayashi |
| 2003/0139504 A1 | 7/2003 | Miebach et al. |
| 2004/0013882 A1 | 1/2004 | Gorey et al. |
| 2004/0097648 A1 | 5/2004 | Nakai et al. |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2005/0253277 A1 | 11/2005 | Yamanaka et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0074148 A1 | 4/2006 | Ahn et al. |
| 2006/0100307 A1 | 5/2006 | Uerz et al. |
| 2007/0055017 A1 | 3/2007 | Schultes et al. |
| 2007/0100073 A1 | 5/2007 | Lee et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0168315 A1 | 7/2010 | Park et al. |
| 2010/0168354 A1 | 7/2010 | Hong et al. |
| 2010/0240831 A1 | 9/2010 | Kim et al. |
| 2010/0256288 A1 | 10/2010 | Kim et al. |
| 2011/0003918 A1 | 1/2011 | Eckel et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0157866 A1 | 6/2011 | Li et al. |
| 2011/0159293 A1 | 6/2011 | Park et al. |
| 2011/0160377 A1* | 6/2011 | Chung .................. C08L 25/12 524/504 |
| 2011/0160380 A1 | 6/2011 | Kwon et al. |
| 2011/0230610 A1 | 9/2011 | Schultes et al. |
| 2012/0016068 A1 | 1/2012 | Chung et al. |
| 2013/0328149 A1 | 12/2013 | Okaniwa et al. |
| 2014/0187717 A1 | 7/2014 | Kwon et al. |
| 2014/0275366 A1 | 9/2014 | Chrino et al. |
| 2015/0152205 A1 | 6/2015 | Kim et al. |
| 2015/0216787 A1 | 8/2015 | Hori et al. |
| 2015/0376315 A1 | 12/2015 | Jang et al. |
| 2015/0376392 A1 | 12/2015 | Kim et al. |
| 2015/0376403 A1 | 12/2015 | Kwon et al. |

FOREIGN PATENT DOCUMENTS

| | | |
|---|---|---|
| CN | 101061179 A | 10/2007 |
| CN | 101768331 A | 7/2010 |
| CN | 102115564 A | 7/2011 |
| CN | 102153848 A | 8/2011 |
| CN | 102329462 A | 1/2012 |
| CN | 102974324 A | 3/2013 |
| CN | 104072659 A | 10/2014 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0107015 A1 | 5/1984 |
| EP | 0149813 | 7/1985 |
| EP | 3370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 3 700 968 A1 | 3/1996 |
| EP | 0721962 A2 | 7/1996 |
| EP | 3 728 811 A2 | 8/1996 |
| EP | 3 767 204 A2 | 4/1997 |
| EP | 0771852 A2 | 5/1997 |
| EP | 0 795 570 A1 | 9/1997 |
| EP | 0909790 A1 | 4/1999 |
| EP | 3 970 997 A2 | 1/2000 |
| EP | 1010725 A2 | 6/2000 |
| EP | 1 069 156 A1 | 1/2001 |
| EP | 1069154 A | 1/2001 |
| EP | 1117742 A0 | 7/2001 |
| EP | 1209163 A1 | 5/2002 |
| EP | 2204412 A1 | 7/2010 |

(56) References Cited

FOREIGN PATENT DOCUMENTS

| | | |
|---|---|---|
| GB | 1042783 A1 | 9/1966 |
| JP | 59-149912 A | 8/1984 |
| JP | 59-202240 | 11/1984 |
| JP | 04-023856 A | 1/1992 |
| JP | 04-359954 A | 12/1992 |
| JP | 31 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-226576 A | 8/2001 |
| JP | 2001-316580 A | 11/2001 |
| JP | 2002-080676 A | 3/2002 |
| JP | 2002-348457 A | 12/2002 |
| JP | 2005-247999 A | 9/2005 |
| JP | 2006-131833 A | 5/2006 |
| JP | 2006-249288 A | 9/2006 |
| JP | 2006-249292 A | 9/2006 |
| JP | 2006-257126 A | 9/2006 |
| JP | 2006-257284 A | 9/2006 |
| JP | 2006-342246 A | 12/2006 |
| JP | 2007-023227 | 2/2007 |
| JP | 2008-292853 A1 | 12/2008 |
| JP | 2014-040512 A | 3/2014 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A1 | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-079118 A | 9/2004 |
| KR | 10-2006-0109470 A | 10/2006 |
| KR | 648114 B1 | 11/2006 |
| KR | 10-0666797 B1 | 1/2007 |
| KR | 10-0767428 B1 | 10/2007 |
| KR | 885819 B1 | 12/2007 |
| KR | 10-2008-0036790 A | 4/2008 |
| KR | 2009-0029539 A | 3/2009 |
| KR | 10-902352 | 6/2009 |
| KR | 10-2011-0079489 A | 7/2011 |
| KR | 10-2012-006839 A | 1/2012 |
| KR | 10-2012-0042026 A | 5/2012 |
| KR | 10-2012-0078417 A | 7/2012 |
| KR | 10-2013-0076616 A | 7/2013 |
| KR | 10-2013-0078747 A | 7/2013 |
| NO | 99 19383 A1 | 4/1999 |
| NO | 00 00544 A1 | 1/2001 |
| NO | 01/66634 A | 9/2001 |
| NO | 00 09518 A1 | 2/2002 |
| NO | 02 46287 A1 | 6/2002 |
| NO | 2006 041237 A1 | 4/2006 |
| NO | 2009/128601 A | 10/2009 |
| WO | 99/57198 A1 | 11/1999 |
| WO | 00/6648 A1 | 2/2000 |
| WO | 00/18844 A1 | 4/2000 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2007/004434 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |

OTHER PUBLICATIONS

Office Action in commonly owned U.S. Appl. No. 12/642,904 dated Dec. 14, 2011, pp. 1-9.
European Search Report in commonly owned European Application No. 09180634 dated Feb. 2, 2010, pp. 1-3.
Xu, "Predicition of Refractive Indices of Linear 3651-8659 Polymers by a four-descriptor QSPR model", Polymer, 45 (2004) pp. 8651-8659.
European Search Report in commonly owned European Application No. 10196806 dated Apr. 27, 2011, pp. 1-5.
Japanese Office Action in commonly owned Japanese Application No. 2010-539284, dated Sep. 11, 2012, pp. 1-3.
Office Action in commonly owned U.S. Appl. No. 121631,018 dated Apr. 26, 2012, pp. 1-12.
Office Action in commonly owned U.S. Appl. No. 12/642,904 dated Mar. 27, 2012, pp. 1-7.
Notice of Allowance in commonly owned U.S. Appl. No. 12/642,904 dated Jul. 2, 2012, pp. 1-8.
Office Action in commonly owned U.S. Appl. No. 121817,302 dated Mar. 29, 2012, pp. 1-5.
Office Action in commonly owned U.S. Appl. No. 121884,549 dated Aug. 21, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
GUIDECHEM, data sheet for RUBA-93, no date, pp. 1-2.
European Search Report in commonly owned European Application No. 08873329.0 dated Dec. 14, 2012, pp. 1-7.
Office Action in commonly owned U.S. Appl. No. 12/972,795 dated Jan. 18, 2013, pp. 1-9.
International Search Report in commonly owned International Application No. PCT/KR2008/07825 dated Aug. 28, 2009, pp. 1-2.
Machine translation of JP 2006-257284, pp. 1-27 (2006).
Office Action in commonly owned U.S. Appl. No. 121880,209 dated Feb. 16, 2011, pp. 1-10.
International Search Report in commonly owned International Application No. PCT/KR2008/07820 dated Jul. 28, 2009, pp. 1-2.
Final Office Action in commonly owned U.S. Appl. No. 12/880,209 dated Jul. 29, 2011, pp. 1-9.
Advisory Action in commonly owned U.S. Appl. No. 12/880,209 dated Nov. 4, 2011, pp. 1-4.
International Search Report in commonly owned International Application No. PCT/KR20081007157, dated May 28, 2009.
Final Office Action in commonly owned U.S. Appl. No. 12/792,176 dated Apr. 19, 2012, pp. 1-10.
Advisory Action in commonly owned U.S. Appl. No. 12/792,176 dated Aug. 23, 2012, pp. 1-4.
European Search Report in commonly owned European Application No. 08873425.6 dated May 29, 2012, pp. 1-5.
Notice of Allowance in commonly owned U.S. Appl. No. 12/880,209 dted Oct. 10, 2013, pp. 1-10.
Paris et al., "Glass Transition Temperature of Allyl Methacrylate-n-Butyl Acrylate Gradient Copolymers in Dependence on Chemical Composition and Molecular Weight", Journal of Polymer Science, Part A (2007) pp. 1-11.

(56) References Cited

OTHER PUBLICATIONS

Wunderlich, "Thermal Analysis of Polymeric Materials", Springer, New York, US (2005) pp. 1-5.
Search Report in commonly owned European Patent Application No. EP 01 27 4302 dated Mar. 4, 2005, pp. 1-4.
Office Action in commonly owned U.S. Appl. No. 11/768,592 dated Apr. 8, 2009, pp. 1-9.
Notice of Allowance in commonly owned U.S. Appl. No. 11/647,101 dated Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
Office Action in commonly owned U.S. Appl. No. 12/961,877 dated Jul. 30, 2012, pp. 1-14.
European Search Report in commonly owned European Application No. 14194463.7 dated Apr. 23, 2015, pp. 1-2.
Search Report in commonly owned Chinese Application No. 201310737841.6 dated Apr. 22, 2015, pp. 1-2.
Baek et al., electronic translation of KR 10-666797, pp. 1-6.
Non-Final Office Action in commonly owned U.S. Appl. No. 14/097,538 dated Mar. 26, 2015, pp. 1-11.
Non-Final Office Action in commonly owned U.S. Appl. No. 14/097,538 dated Aug. 11, 2015, pp. 1-6.
Final Office Action in commonly owned U.S. Appl. No. 14/097,538 dated Nov. 23, 2015, pp. 1-7.
Notice of Allowance in commonly owned U.S. Appl. No. 14/097,538 dated Mar. 30, 2016, pp. 1-9.
Extended Search Report in commonly owned European Application No. 15194797.5 dated Mar. 18, 2016, pp. 1-7.
Non-Final Office Action in commonly owned U.S. Appl. No. 14/749,861 dated Nov. 20, 2015, pp. 1-17.
Final Office Action in commonly owned U.S. Appl. No. 14/747,207 dated Dec. 5, 2016, pp. 1-8.
Non-Final Office Action in commonly owned U.S. Appl. No. 14/750,364 dated Jun. 16, 2016, pp. 1-7.
Notice of Allowance in commonly owned U.S. Appl. No. 14/750,364 dated Oct. 6, 2016, pp. 1-8.
Non-Final Office Action in commonly owned U.S. Appl. No. 14/748,576 dated Feb. 16, 2016, pp. 1-9.
Notice of Allowance in commonly owned U.S. Appl. No. 14/748,576 dated Jun. 29, 2016, pp. 1-9.
Final Office Action in commonly owned U.S. Appl. No. 14/749,861 dated May 31, 2016, pp. 1-9.
Notice of Allowance in commonly owned U.S. Appl. No. 14/749,861 dated Aug. 25, 2016, pp. 1-7.
Non-Final Office Action in commonly owned U.S. Appl. No. 14/557,478 dated Jun. 4, 2015, pp. 1-9.
Final Office Action in commonly owned U.S. Appl. No. 14/557,478 dated Oct. 30, 2015, pp. 1-6.
Notice of Allowance in commonly owned U.S. Appl. No. 14/557,478 dated Feb. 18, 2016, pp. 1-5.
Non-Final Office Action in commonly owned U.S. Appl. No. 14/930,954 dated Oct. 18, 2016, pp. 1-13.
Non-Final Office Action in commonly owned U.S. Appl. No. 14/747,207 dated Aug. 2, 2016, pp. 1-17.
Office Action in commonly owned Korean Application No. 10-2014-0140473 dated Oct. 19, 2016, pp. 1-5.
Office Action in commonly owned Korean Application No. 10-2014-0139128 dated Sep. 23, 2016, pp. 1-6.
Office Action in commonly owned Korean Application No. 10-2014-0160794 dated Dec. 9, 2016, pp. 1-5.
European Search Report for commonly owned European Application No. EP 04808586, completed on Sep. 25, 2007.
Chinese Office Action in commonly owned Chinese Application No. 200880128614.0 dated Mar. 7, 2012, pp. 1-5.
English-translation of Chinese Office Action in commonly owned Chinese Application No. 200880128614.0 dated Mar. 7, 2012, pp. 1-2.
Advisory Action in commonly owned U.S. Appl. No. 12/631,018 dated Nov. 7, 2012, pp. 1-3.
Final Office Action in commonly owned U.S. Appl. No. 12/817,302 dated Feb. 7, 2013, pp. 1-6.
Final Office Action in commonly owned U.S. Appl. No. 12/884,549 dated Dec. 18, 2012, pp. 1-7.
Notice of Allowance in commonly owned U.S. Appl. No. 12/884,549 dated Apr. 11, 2013, pp. 1-8.
European Search Report in commonly owned European Application No. 07024808, dated Mar. 18, 2008, pp. 1-2.
Machine Translation of JP 10-017762 (2011).
Derwent Abstract of JP 2002348457 (A) (2003).
Full English Translation of JP-10-017762 (2011).
Advisory Action in commonly owned U.S. Appl. No. 12/817,302 dated May 16, 2013, pp. 1-5.
Office Action in commonly owned U.S. Appl. No. 12/898,012 dated Dec. 21, 2012, pp. 1-6.
Notice of Allowance in commonly owned U.S. Appl. No. 12/972,795 dated May 24, 2013, pp. 1-8.
Chinese Office Action in commonly owned Chinese Application No. 201010597679.9 dated Aug. 27, 2012, pp. 1-5.
European Search Report in commonly owned European Application No. 10194938.6 dated Jul. 21, 2011, pp. 1-5.
Notice of Allowance in commonly owned U.S. Appl. No. 12/961,877 dated Jun. 19, 2013, pp. 1-10.
Final Office Action in commonly owned U.S. Appl. No. 12/961,877 dated Nov. 28, 2012, pp. 1-10.
Advisory Action in commonly owned U.S. Appl. No. 12/961,877 dated Mar. 12, 2013, pp. 1-2.
Silicones: An Introduction to Their Chemistry and Application, The Plastics Institute 1962, p. 27.
Extended European Search Report in commonly owned European Application No. 09180865.9, dated Apr. 16, 2010.
Office Action in commonly owned Chinese Application No. 201510792588.3 dated Mar. 10, 2017, pp. 1-7.
Office Action in commonly owned U.S. Appl. No. 14/930,954 dated Apr. 17, 2017, pp. 1-13.
Advisory Action in commonly owned U.S. Appl. No. 14/747,207 dated Mar. 15, 2017, pp. 1-5.
Office Action in commonly owned U.S. Appl. No. 14/749,861 dated Jan. 9, 2017, pp. 1-8.
Office Action in commonly owned U.S. Appl. No. 14/747,176 dated Apr. 11, 2016, pp. 1-8.
Final Office Action in commonly owned U.S. Appl. No. 14/747,176 dated Jul. 27, 2016, pp. 1-6.
Notice of Allowance in commonly owned U.S. Appl. No. 14/747,176 dated Oct. 7, 2016, pp. 1-6.
Office Action in commonly owned U.S. Appl. No. 14/747,176 dated May 10, pp. 1-6.
Office Action in commonly owned Chinese Application No. 201510364557.8 dated Mar. 31, 2017, pp. 1-6.
Office Action in commonly owned Application Serial No. 14/747,207 dated Jul. 25, 2017, pp. 1-9.

* cited by examiner

THERMOPLASTIC RESIN COMPOSITION AND MOLDED ARTICLE MADE USING THE SAME

CROSS-REFERENCE TO RELATED APPLICATION

This application claims the benefit of priority under 35 U.S.C. §119(a) of Korean Patent Application No. 10-2014-0079920, filed on Jun. 27, 2014, and Korean Patent Application No. 10-2015-0085365, filed on Jun. 16, 2015, in the Korean Intellectual Property Office, the entire disclosure of each of which is incorporated herein by reference for all purposes.

FIELD

The present invention relates to a thermoplastic resin composition and a molded article made using the same.

BACKGROUND

Thermoplastic resins have a lower specific gravity than glass or metal and can have excellent mechanical physical properties such as excellent moldability and impact resistance. Plastic products made using such thermoplastic resins are quickly replacing conventional glass and metal products in fields such as electric and electronic products and automobile components.

Recently, there is a growing demand by users for an environmentally-friendly non-painted resin, as well as a growing demand by users for a metallic resin with a metallic like appearance imparted thereto by the resin itself without a coating process. Also, materials with low gloss or no gloss are increasingly being used in plastic materials for interior and exterior automobile components, in order to provide a luxurious appearance and touch.

A metallic appearance can be imparted to a resin without a coating process by adding metal particles to a resin composition. However, there can be appearance problems caused by flow-marks or weld-lines caused by the metal particles after an injection molding. Also, a mold should be additionally changed or the application is limited.

In order to solve these problems, Korean patent laid-open publication No. 2013-0078747 discusses controlling the shape or the aspect ratio of a metal particle. Also there is research directed to improving a surface coating material for a metal particle. However, even though these can provide some improvements, there also can be a limit on improving appearance problems, such as flow-marks or weld-lines caused by non-uniformity, agglomeration, and/or orientation of metal particles after an injection molding.

In addition, there are methods using rubber polymer particles having a large particle size or a matting agent to control the degree of gloss of a material itself. When the degree of gloss is controlled only with the rubber polymer particle having a large particle size, a large amount of the rubber polymer particles should be used to provide sufficient matting effect. The increased amount of rubber polymer, however, can decrease heat resistance, hardness, and/or light resistance.

When the amount of a matting agent is increased to provide a sufficient matting effect, impact resistance, flowability, and the like can be sharply reduced. In addition, although the matting effect itself can be excellent, appearance can be irregular.

Therefore, in order to resolve the aforementioned problems, there is a growing need to develop a thermoplastic resin composition providing excellent appearance with minimal or no deterioration of physical properties such as impact resistance and the like, by controlling the degree of gloss and the shielding ability of a material itself.

SUMMARY

Therefore, a purpose of various embodiments of the present disclosure is to provide a thermoplastic resin composition that is capable of maintaining excellent mechanical properties such as impact strength and the like and can provide excellent appearance by minimizing appearance problems due to the orientation or non-uniformity of metal particles by controlling the degree of gloss and the shielding ability of the resin composition without the use of a rubber polymer particle having large particle size or a specific matting agent, by using a branched copolymer prepared by adding a silicon compound having two or more unsaturated radicals into a polycarbonate resin composition in the optimum ratio, and a molded article manufactured from the same.

Furthermore, another purpose of various embodiment of the present disclosure is to provide a thermoplastic resin composition that can have excellent appearance properties by minimizing the appearance problems due to the orientation or non-uniformity of a metal particle by controlling the degree of gloss and the shielding ability while maintaining excellent impact resistance and light resistance, by using a rubber-modified aromatic vinyl copolymer having the optimum particle size and rubber polymer amount, and a molded article manufacture from the same.

In order to achieve the above-described purposes, exemplary embodiments include a thermoplastic resin composition comprising (A) a polycarbonate resin, (B) a rubber-modified aromatic vinyl copolymer, (C) a branched copolymer comprising a silicon compound having two or more unsaturated radicals, and (D) metal particles.

The branched copolymer (C) may be produced from a mixture comprising about 0.1 to about 10 parts by weight of a silicon compound (C-3) having two or more unsaturated radicals, based on about 100 parts by weight of a monomer mixture comprising about 60 to about 85 weight % of an aromatic vinyl compound (C-1) and about 15 to about 40 weight % of an unsaturated nitrile compound (C-2).

In addition, the silicon compound (C-3) may be represented by the following Chemical Formula 1:

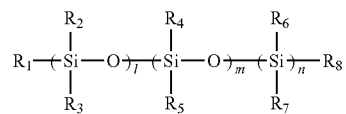

wherein, each of l, m and n is the same or different and each is independently an integer of 0 to 100 (with the proviso that l, m and n are not all 0 at the same time); each of $R_1$ to $R_8$ is the same or different and each is independently hydrogen, substituted or unsubstituted $C_1$ to $C_{30}$ alkyl, substituted or unsubstituted $C_2$ to $C_{30}$ alkenyl, substituted or unsubstituted $C_2$ to $C_{30}$ alkynyl, substituted or unsubstituted $C_3$ to $C_{30}$ cycloalkyl, substituted or unsubstituted $C_6$ to $C_{30}$ aryl, substituted or unsubstituted $C_1$ to $C_{30}$ heteroaryl, hydroxyl, alkoxyl, amino, epoxy, carboxyl, halogen, ester, isocyanate, or mercapto group; with the proviso that at least two of $R_1$ to $R_8$ include an unsaturated radical that may be polymerized; and the compound has a linear or ring structure.

In addition, the silicon compound (C-3) may be represented by the following Chemical Formula 2:

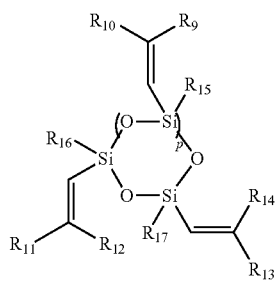

wherein, each of $R_9$ to $R_{14}$ is the same or different and each is independently substituted or unsubstituted $C_1$ to $C_{20}$ alkyl, substituted or unsubstituted $C_2$ to $C_{20}$ alkenyl, or substituted and unsubstituted $C_6$ to $C_{20}$ aryl; each of $R_{15}$ to $R_{17}$ is the same or different and each is independently hydrogen or substituted or unsubstituted $C_1$ to $C_6$ alkyl, and p is an integer of 1 to 6.

Examples of the silicon compound (C-3) may include without limitation 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and mixtures thereof.

In addition, the branched copolymer (C) may be produced by further adding one or more multifunctional vinyl compounds. Examples of the multifunctional vinyl compounds may include without limitation divinyl polydimethylsiloxane, vinyl modified dimethylsiloxane, divinybenzene, ethylene glycol di(meth)acrylate, allyl(meth)acrylate, diallyl phthalate, diallyl malate, triallyl isocyanurate, and the like, and combinations thereof, to the mixture.

Examples of the aromatic vinyl compound (C-1) may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and combinations thereof.

Examples of the unsaturated nitrile compound (C-2) may include without limitation acrylonitrile, methacrylonitrile, fumaronitrile, and the like, and combinations thereof.

The rubber-modified aromatic vinyl copolymer (B) may comprise about 10 to about 70 weight % of a rubber polymer, and the rubber polymer may have an average particle size of about 0.1 to about 20 μm.

The average particle size of the metal particles (D) may be about 5 to about 100 μm, and particles of various metal components may be used, for example, aluminum particles may be used. As the metal particles (D), one kind of metal particle or a combination of two or more kinds of metal particles with different average particle sizes may be used.

Furthermore, the thermoplastic resin composition of the present disclosure may further comprise at least one of an aromatic vinyl copolymer (E) and/or a matting agent (F).

The thermoplastic resin composition of the present disclosure may comprise about 50 to about 85 weight % of the polycarbonate resin (A), about 1 to about 40 weight % of the rubber-modified aromatic vinyl copolymer (B), and about 1 to about 30 weight % of the branched copolymer (C), each based on the total weight (100 weight %) of the polycarbonate resin (A), the rubber-modified aromatic vinyl copolymer (B), and the branched copolymer (D), and about 0.1 to 5 parts by weight of the metal particles (D) based on about 100 parts by weight of the polycarbonate resin (A), the rubber-modified aromatic vinyl copolymer (B), and the branched copolymer (C).

Furthermore, the thermoplastic resin composition of the present disclosure may comprise the aromatic vinyl copolymer (E) in the amount of 0 to about 30 parts by weight based on about 100 parts by weight of the polycarbonate resin (A), the rubber-modified aromatic vinyl copolymer (B), and the branched copolymer (C), and the matting agent (F) in the amount of 0 to about 10 parts by weight based on about 100 parts by weight of the polycarbonate resin (A), the rubber-modified aromatic vinyl copolymer (B), and the branched copolymer (C).

Exemplary embodiments further include a molded article manufactured using the thermoplastic resin composition that can have excellent appearance properties according to the present disclosure.

The molded article may have a degree of gloss of about 20 to about 80 GU, which is measured at an angle of 60° by the evaluation method according to ASTM D523. The molded article may have a ΔE value of about 3.0 or less after exposure to 1,050 kJ/m² measured by the evaluation method according to SAE J 1885 or after exposure to 2,400 kJ/m² measured by the evaluation method according to FLTM BO 116-01.

In various exemplary embodiments of the present disclosure, it can be possible to implement excellent appearance and also exhibit excellent physical properties and light resistance by minimizing the appearance problems caused by the orientation or non-uniformity of metal particles by controlling the degree of gloss and the shielding ability of a resin composition, by adding a branched copolymer comprising a silicon compound to a resin composition comprising a polycarbonate resin, a rubber-modified aromatic vinyl copolymer, and metal particles.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinbelow, explanation will be made on a thermoplastic resin composition according to the present disclosure and a molded product using the same.

The present invention relates to a thermoplastic resin composition that can have excellent appearance properties and a molded article manufactured by the same.

First, the thermoplastic resin composition that can have excellent appearance properties according to the present disclosure may comprise a polycarbonate resin (A), rubber-modified aromatic vinyl copolymer (B), branched copolymer including a silicon compound having two or more unsaturated radicals (C), and metal particles (D). These components can provide excellent metal particle shielding property, matting characteristics, impact resistance and the like. Each of these components will be explained in detail hereinbelow.

The thermoplastic resin composition of the present disclosure may comprise about 50 to about 85 weight % of the polycarbonate resin (A), about 1 to about 40 weight % of the rubber-modified aromatic vinyl copolymer (B), and about 1 to about 30 weight % of the branched copolymer (C), wherein the amount of each of (A), (B), and (C) is based on the total weight (100 weight %) of the polycarbonate resin (A), the rubber-modified aromatic vinyl copolymer (B), and the branched copolymer (D), and about 0.1 to 5 parts by weight of the metal particles (D) based on about 100 parts by weight of the polycarbonate resin (A), the rubber-modified aromatic vinyl copolymer (B), and the branched copolymer (D).

In exemplary embodiments, the thermoplastic resin composition of the present disclosure may include about 50 to about 80 weight % of the polycarbonate resin (A), about 5 to about 30 weight % of the rubber-modified aromatic vinyl copolymer (B), and about 5 to about 30 weight % of the branched copolymer (C), wherein the amount of each of (A), (B), and (C) is based on the total weight (100 weight %) of the polycarbonate resin (A), the rubber-modified aromatic vinyl copolymer (B), and the branched copolymer (D), and about 0.5 to about 2 parts by weight of the metal particles (D) based on about 100 parts by weight of the polycarbonate resin (A), the rubber-modified aromatic vinyl copolymer (B), and the branched copolymer (D). The appearance properties and physical properties may be maximized in the above-described amount ratios.

In some embodiments, the thermoplastic resin composition may comprise the polycarbonate resin (A) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 weight %. Further, according to some embodiments of the present invention, the amount of polycarbonate resin (A) can be in a range from about any of the foregoing amounts to about any other of the foregoing amounts.

In some embodiments, the thermoplastic resin composition may comprise the rubber-modified aromatic vinyl copolymer (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 weight %. Further, according to some embodiments of the present invention, the amount of rubber-modified aromatic vinyl copolymer (B) can be in a range from about any of the foregoing amounts to about any other of the foregoing amounts.

In some embodiments, the thermoplastic resin composition may comprise the branched copolymer (C) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 weight %. Further, according to some embodiments of the present invention, the amount of branched copolymer (C) can be in a range from about any of the foregoing amounts to about any other of the foregoing amounts.

In some embodiments, the thermoplastic resin composition may comprise the metal particles (D) in an amount of about 0.1, 0.2, 0.3, 0.4, 0.5, 0.6, 0.7, 0.8, 0.9, 1, 2, 3, 4, or 5 parts by weight. Further, according to some embodiments of the present invention, the amount of metal particles (D) can be in a range from about any of the foregoing amounts to about any other of the foregoing amounts.

(A) Polycarbonate Resin

The polycarbonate resin used in the present disclosure may be an aromatic polycarbonate resin produced by reacting a diphenol represented by the following Chemical Formula with phosgene, halogen formate, and/or carbonic acid diester.

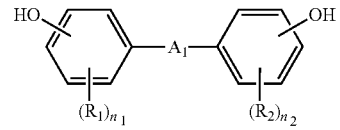

wherein, $A_1$ is a single bond, substituted or unsubstituted $C_1$ to $C_5$ alkylene, substituted or unsubstituted $C_1$ to $C_5$ alkylidene, substituted or unsubstituted $C_3$ to $C_6$ cycloalkylene, substituted or unsubstituted $C_5$ to $C_6$ cycloalkylidene, CO, S, or $SO_2$; each of $R_1$ and $R_2$ is the same or different and each is independently substituted or unsubstituted $C_1$ to $C_{30}$ alkyl or substituted or unsubstituted $C_6$ to $C_{30}$ aryl; and each of $n_1$ and $n_2$ is the same or different and each is independently an integer of 0 to 4.

As used herein, unless otherwise defined, the term "substituted" means that a hydrogen atom has been substituted by a halogen radical, $C_1$ to $C_{30}$ alkyl, $C_1$ to $C_{30}$ haloalkyl, $C_6$ to $C_{30}$ aryl, $C_2$ to $C_{30}$ heteroaryl, $C_1$ to $C_{20}$ alkoxy, or a combination thereof. Also as used herein, unless otherwise defined, the term "hetero" refers to a nitrogen, sulfur, oxygen, and/or phosphorus atom in place of a carbon atom.

Examples of the diphenol may include without limitation hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, 2,2-bis-(3-methyl-4-hydroxyphenyl)-propane, 2,2-bis-(3,5-dimethyl-4-hydroxyphenyl)-propane, and the like, and mixtures thereof. In exemplary embodiments, 2,2-bis-(4-hydroxyphenyl)-propane, 2,2-bis-(3,5-dichloro-4-hydroxyphenyl)-propane, 2,2-bis-(3-methyl-4-hydroxyphenyl)-propane, 2,2-bis-(3,5-dimethyl-4-hydroxyphenyl)-propane and/or 1,1-bis-(4-hydroxyphenyl)-cyclohexane may be used. In addition, 2,2-bis-(4-hydroxyphenyl)-propane (also called bisphenol-A) may be used.

The polycarbonate resin used in the present disclosure may have the weight average molecular weight (Mw) of about 10,000 to about 50,000 g/mol, for example, the weight average molecular weight (Mw) of about 15,000 to about 40,000 g/mol, but the present invention is not limited thereto.

The polycarbonate resin may be a polycarbonate resin having a branched-chain. For example, the polycarbonate resin may be produced by adding a tri- or higher multifunctional compound, for example, a compound with trivalent or more phenol radicals, in an amount of about 0.05 to about 2 mol % based on the total mol % of diphenols used in the polymerization.

The polycarbonate resin used in the present disclosure may include a homopolycarbonate resin and/or a copolycarbonate resin. Also, a blend of one or more copolycarbonate resins and/or one or more homopolycarbonate resins may be used.

Some or an entirety of the aforementioned polycarbonate resin of the present disclosure may be replaced by an aromatic polyester-carbonate resin obtained through a polymerization reaction in the presence of an ester precursor, for example, a difunctional carboxylic acid.

(B) Rubber-modified Aromatic Vinyl Copolymer

The rubber-modified aromatic vinyl copolymer used in the present disclosure may be a resin polymer in which a grafted rubber polymer exists as dispersed particles in a matrix (continuous phase) including a copolymer of an aromatic vinyl compound and a vinyl compound that may be copolymerized with the aromatic vinyl compound. In addition, such a rubber-modified aromatic vinyl copolymer may be a grafted copolymer produced by adding an aromatic vinyl compound and a vinyl compound that may be copolymerized with the aromatic vinyl compound in the presence of a rubber polymer, and graft-copolymerizing the same, and may include the grafted rubber polymer. Such a rubber-modified aromatic vinyl copolymer may be produced by known polymerization methods such as emulsion polymerization, solution polymerization, suspension polymerization, and mass polymerization.

In general, the rubber-modified aromatic vinyl copolymer including the grafted rubber polymer being dispersed in the form of particles may be produced by producing a grafted rubber polymer with the high content of a rubber polymer and an aromatic vinyl copolymer with no rubber polymer separately, and then melting/mixing them in a suitable manner according to the purpose of use. However, when using the mass polymerization method, the rubber-modified aromatic vinyl copolymer including the grafted rubber polymer being dispersed in the form of particles may be produced through a continuous reaction process at one time without producing the grafted rubber polymer and the aromatic vinyl copolymer separately and melting/mixing them.

Examples of the rubber-modified aromatic vinyl copolymer used in the present disclosure may include without limitation an acrylonitrile-butadiene-styrene copolymer (ABS), acrylonitrile-styrene-acrylate copolymer (ASA), acrylonitrile-ethylene propylene rubber-styrene copolymer (AES), methyl methacrylate-butadiene-styrene copolymer (MBS), and the like, and mixtures thereof.

Examples of the rubber polymer that may be used in the rubber-modified aromatic vinyl copolymer may include without limitation diene rubber polymers such as polybutadiene, styrene-butadiene copolymer, acrylonitrile-butadiene copolymer and the like; saturated rubber polymers which are hydrogenated diene rubber polymer; isoprene rubber polymers; acrylic-based rubber polymers such as butyl acrylate and the like; ethylene/propylene/diene monomer ternary copolymers (EPDM) and the like, and mixtures thereof. In exemplary embodiments, the rubber polymer may include polybutadiene.

The amount of the rubber polymer may be about 10 to about 70 weight %, for example about 15 to about 60 weight %, based on the total weight (100 weight %) of the rubber-modified aromatic vinyl copolymer. In some embodiments, the amount of the rubber polymer may be about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 weight %. Further, according to some embodiments of the present invention, the amount of the rubber polymer can be in a range from about any of the foregoing amounts to about any other of the foregoing amounts When the rubber polymer is present in an amount within the aforementioned range, impact resistance and/or light resistance may be optimized. Furthermore, the rubber-modified aromatic vinyl copolymer may be used as a combination of two or more types having the different amounts of the rubber polymer.

The rubber-modified aromatic vinyl copolymer may include a rubber polymer having the average particle size of about 0.1 to about 20 μm, for example, about 0.1 to about 10 μm, and as another example about 0.1 to about 5 μm. The above-described particle size can help improve the shielding effect of a metal particle by the rubber polymer having a large particle size and also can help strengthen impact resistance and the like. The rubber-modified aromatic vinyl copolymer may include two or more of the rubber polymers having different average particle sizes.

Herein, the particle size may be expressed by an average size of a group, the average size being digitized by a measurement method, but there are also a mode diameter that represents a maximum value of a distribution, a median diameter that corresponds to a median value of an integral calculus distribution curve, and various average diameters (number average, length average, area average, mass average, volume average and the like) that are more commonly used. In the present disclosure, however, an average particle size refers to a number average diameter that is a measurement of D50 (a particle size of the point where the distribution rate is 50%) unless expressed otherwise.

Examples of the aromatic vinyl compound that may be graft-copolymerized with the rubber polymer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and combinations thereof. In exemplary embodiments, the aromatic vinyl compound may include styrene.

Examples of the vinyl compound that may be copolymerized with the aromatic vinyl compound may include without limitation acrylonitrile, methacrylonitrile, methacrylic acid alkyl esters, acrylic acid alkyl esters, maleic anhydride, alkyl and/or phenyl nucleus-substituted maleimide, and the like, and combinations thereof. Here, the term alkyl means $C_1$ to $C_8$ alkyl. In exemplary embodiments, the vinyl compound may include acrylonitrile.

(C) Branched Copolymer

The branched copolymer used in the thermoplastic resin composition of the present disclosure may be produced from a mixture that includes an aromatic vinyl compound (C-1), an unsaturated nitrile compound (C-2), and a silicon compound having two or more unsaturated radicals (C-3).

Hereinbelow, each component will be explained in more detail.

(C-1) Aromatic Vinyl Compound

Examples of the aromatic vinyl compound may include styrene, α-methylstyrene, β-methylstyrene, p-methylstyrene, p-t-butyl styrene, ethylstyrene, vinylxylene, monochlorostyrene, dichlorostyrene, dibromostyrene, vinylnaphthalene, and the like, and combinations thereof, but the present disclosure is not limited thereto.

In exemplary embodiments, the aromatic vinyl compound may include styrene, α-methylstyrene, or a combination thereof.

The monomer mixture for producing the branched copolymer may include the aromatic vinyl compound in an amount of about 60 to about 85 weight % based on the total weight (100 weight %) of the mixture. In some embodiments, the monomer mixture for producing the branched copolymer may comprise the aromatic vinyl compound in an amount of about 60, 61, 62, 63, 64, 65, 66, 67, 68, 69, 70, 71, 72, 73, 74, 75, 76, 77, 78, 79, 80, 81, 82, 83, 84, or 85 weight %. Further, according to some embodiments of the present invention, the amount of the aromatic vinyl compound can be in a range from about any of the foregoing amounts to about any other of the foregoing amounts.

Within the above range, it is possible to improve the impact resistance and/or heat resistance of the thermoplastic resin composition.

(C-2) Unsaturated Nitrile Compound

Examples of the unsaturated nitrile compound may include without limitation acrylonitrile, methacrylonitrile, fumaronitrile, and the like, and combinations thereof, but the present disclosure is not limited thereto.

In exemplary embodiments, the unsaturated nitrile compound may include acrylonitrile.

The monomer mixture for producing the branched copolymer may comprise the unsaturated nitrile compound in an amount of about 15 to about 40 weight % based on the total weight (100 weight %) of the monomer mixture for preparing a branched copolymer. In some embodiments, the monomer mixture for producing the branched copolymer may comprise the unsaturated nitrile compound in an amount of about 15, 16, 17, 18, 19, 20, 21, 22, 23, 24, 25, 26, 27, 28, 29, 30, 31, 32, 33, 34, 35, 36, 37, 38, 39, or 40 weight %. Further, according to some embodiments of the present invention, the amount of the unsaturated nitrile compound can be in a range from about any of the foregoing amounts to about any other of the foregoing amounts.

The weight ratio of the aromatic vinyl compound to the unsaturated nitrile compound (aromatic vinyl compound: unsaturated nitrile compound) may be about 6:4 to about 8.5:1.5, for example about 7:3 to about 8:2. When within the above range, the unsaturated nitrile compound, in combination with other components, may improve the matting characteristics with minimal or no deterioration of the mechanical physical properties and/or molding processability of the thermoplastic resin composition.

(C-3) Silicon Compound Having Two or More Unsaturated Radicals

In the present disclosure, the silicon compound having two or more unsaturated radicals may be used to realize excellent matting characteristics while maintaining general physical properties such as impact resistance and the like.

The silicon compound having two or more unsaturated radicals may include one or a mixture of two or more compounds represented by the following Chemical Formula 1.

[Chemical Formula 1]

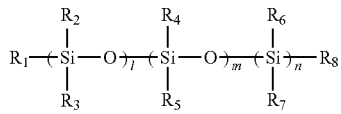

In Chemical Formula 1, each of l, m and n is the same or different and each is independently an integer 0 to 100 (with the proviso that l, m and n are not all 0 at the same time); each of $R_1$ to $R_8$ is the same or different and each is independently hydrogen, saturated or unsaturated $C_1$ to $C_{30}$ alkyl, saturated or unsaturated $C_2$ to $C_{30}$ alkenyl, saturated or unsaturated $C_2$ to $C_{30}$ alkynyl, saturated or unsaturated $C_3$ to $C_{30}$ cycloalkyl, saturated or unsaturated $C_6$ to $C_{30}$ aryl, saturated or unsaturated $C_1$ to $C_{30}$ heteroaryl, hydroxyl, alkoxyl, amino, epoxy, carboxyl, halogen, ester, isocyanate, or mercapto; with the proviso that at least two of $R_1$ to $R_8$ include an unsaturated radical that may be polymerized. The aforementioned compound may have a linear or ring structure.

In exemplary embodiments, a silicon compound having two or more unsaturated radicals may be represented by the following Chemical Formula 2.

[Chemical Formula 2]

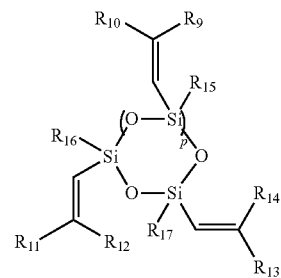

In Chemical Formula 2, each of $R_9$ to $R_{14}$ is the same or different and each is independently substituted or unsubstituted $C_1$ to $C_{20}$ alkyl, substituted or unsubstituted $C_2$ to $C_{20}$ alkenyl, or substituted or unsubstituted $C_6$ to $C_{20}$ aryl; each of $R_{15}$ to $R_{17}$ is the same or different and each is independently hydrogen or substituted or unsubstituted $C_1$ to $C_6$ alkyl; and p is an integer of 1 to 6.

Examples of the aforementioned silicon compound having two or more unsaturated radicals may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri sec-butyl-1,3,5-trivinyl-cyclotrisiloxane, 1,3,5,7-tetra sec-butyl-1,3,5,7-tetravinyl-cyclotetrasiloxane, 1,3,5,7,9-penta sec-butyl-1,3,5,7,9-pentavinyl-cyclopentasiloxane, 1,3,5-triisopropyl-1,3,5-trimethyl-cyclotrisiloxane, 1,3,5,7-tetraisopropyl-1,3,5,7-tetramethyl-cyclotetrasiloxane, 1,3,5,7,9-pentaisopropyl-1,3,5,7,9-pentamethyl-cyclopentasiloxane, 1,3,5-triisopropyl-1,3,5-triethyl-cyclotrisiloxane, 1,3,5,7-tetraisopropyl-1,3,5,7-tetraethyl-cyclotetrasiloxane, 1,3,5,7,9-pentaisopropyl-1,3,5,7,9-pentaethyl-cyclopentasiloxane, 1,1,3,3,5,5-hexaisopropyl-cyclotrisiloxane, 1,1,3,3,5,5,7,7-octaisopropyl-cyclotetrasiloxane, 1,1,3,3,5,5,7,7,9,9-decaiisopropyl-cyclopentasiloxane, 1,3,5-tri sec-butyl-1,3,5-trimethyl-cyclotrisiloxane, 1,3,5,7-tetra sec-butyl-1,3,5,7-tetramethyl-cyclortetrasiloxane, 1,3,5,7,9-penta sec-butyl-1,3,5,7,9- pentamethyl-cyclopentasiloxane, 1,3,5-tri sec-butyl-1,3,5-triethyl-cyclotrisiloxane, 1,3,5,7-tetra sec-butyl-1,3,5,7-tetraethyl-cyclotetrasiloxane, 1,3,5,7,9-penta sec-butyl-1,3,5,7,9-pentaethyl-cyclopentasiloxane, 1,3,5-triisopropyl-cyclotrisiloxane, 1,3,5,7-tetraisopropyl-cyclotetrasiloxane, 1,3,5,7,9-pentaisopropyl-cyclopentasiloxane, 1,3,5-tri sec-butyl-cyclotrisiloxane, 1,3,5,7-tetra sec-butyl-cyclotetrasiloxane, 1,3,5,7,9-penta sec-butyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and combinations thereof. In exemplary embodiments, the aforementioned silicon compound having two or more unsaturated radicals may include one or more selected from the group consisting of 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof. In exemplary embodiments, the aforementioned silicon compound having two or more unsaturated radicals may include 1,3,5,7-tetramethyl-1,3,5,7-tetravinyl-cyclotetrasiloxane.

The aforementioned silicon compound having two or more unsaturated radicals may realize, solely or in a combination with other components, not only matting characteristics that were difficult to be realized by a conventional cross-linking agent, but also realize general physical properties such as excellent impact resistance and/or heat resistance. It may also control the degree of cross-linking and polymerization reaction speed more easily than a conventional cross-linking agent.

The aforementioned silicon compound having two or more unsaturated radicals may have a molecular weight or a weight-average molecular weight of about 150 to about 6,000 g/mol. When the weight average molecular weight of the silicon compound satisfies the above range, a cross-linking reaction may be processed and controlled smoothly, thereby realizing excellent matting characteristics.

The monomer mixture for producing the branched copolymer may comprise the aforementioned silicon compound having two or more unsaturated radicals in an amount of about 0.1 to about 10 parts by weight, for example about 0.1 to about 8 parts by weight, and as another example about 0.5 to about 5 parts by weight, based on about 100 parts by weight of the monomer mixture that includes the aromatic vinyl compound and the unsaturated nitrile compound. In some embodiments, the monomer mixture for producing the branched copolymer may comprise the aforementioned silicon compound in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of silicon compound can be in a range from about any of the foregoing amounts to about any other of the foregoing amounts.

When the amount of the silicon compound is within the aforementioned range, it can be possible to easily control the degree of cross-linking of the branched copolymer, and thus, realize excellent matting characteristics and also, minimize the deterioration of the impact resistance and flowability.

The branched copolymer of the present disclosure may be produced from a mixture that further includes one or more multifunctional vinyl compounds. Examples of the multifunctional vinyl compounds include without limitation divinyl polydimethylsiloxane, vinyl-modified dimethylsiloxane, divinylbenzene, ethylene glycol di(meth)acrylate, allyl (meth)acrylate, diallylphthalate, diallylmalate, triallylisocyanurate, and the like, and combinations thereof. In exemplary embodiments, the multifunctional vinyl compounds can include divinyl polydimethylsiloxane, vinyl-modified dimethylsiloxane, or a combination thereof.

The branched copolymer may comprise the multifunctional vinyl compound in an amount of about 0.001 to about 10 parts by weight, for example about 0.01 to about 3 parts by weight, based on about 100 parts by weight of the monomer mixture that comprises the aromatic vinyl compound and the unsaturated nitrile compound. In some embodiments, the monomer mixture for producing the branched copolymer may comprise the multifunctional vinyl compound in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of multifunctional vinyl compound can be in a range from about any of the foregoing amounts to about any other of the foregoing amounts.

When the branched copolymer includes the multifunctional vinyl compound in an amount within the aforementioned range, the degree of cross-linking and/or polymerization reaction speed of the branched copolymer can be easily controlled, and the multifunctional vinyl compound in combination with other components may realize matting characteristics with minimal or no deterioration of impact resistance and/or heat resistance.

The branched copolymer of the present disclosure may have a glass transition temperature (Tg) of about 95 to about 115° C. When within this range, the branched copolymer of the present disclosure may realize excellent matting characteristics with minimal or no deterioration of impact resistance and/or heat resistance of the thermoplastic resin composition that comprises the branched copolymer.

The branched copolymer of the present disclosure may be produced using a common polymerization method such as a suspension polymerization, an emulsion polymerization, a mass polymerization, and a solution polymerization, but without limitation. As an example of the method for producing the copolymer, the suspension polymerization may be used. When the branched copolymer is produced by the suspension polymerization method, the dispersibility may be improved by using an inorganic dispersant and/or organic dispersant. A homopolymer and/or copolymer of acrylic acid and/or methacrylic acid may be used as the organic dispersant. When using the copolymer as the organic dispersant, the acrylic acid and/or methacrylic acid may be used in an amount of about 50 parts by weight or more based on about 100 parts by weight of the branched copolymer. Furthermore, the aforementioned acrylic acid and/or methacrylic acid may be in the form of salt of sodium, calcium, and/or ammonium for maintaining the proper solubility of the acrylic acid and/or methacrylic acid.

As a polymerization initiator used in producing the branched copolymer by copolymerization, azobisisobutyronitrile may be used, but without limitation.

The branched copolymer of the present disclosure may be used to realize excellent appearance properties by improving the shielding property of metal particles through controlling the degree of gloss of the thermoplastic resin composition, and the thermoplastic resin composition that comprises the branched copolymer may exhibit excellent appearance properties with minimal or no deterioration of physical properties of the thermoplastic resin composition such as impact resistance and the like.

(D) Metal Particles

The metal particles used in the present disclosure may be used singly or in combination of two or more types. The type of metal particles may be changed according to the metallic appearance to be desired. The material for the metal particles may be any kinds of metals and/or alloys, for example aluminum. In addition, the surface of the metal particles may be coated and/or surface-treated.

The metal particles (D) may be included in an amount of about 0.1 to about 5 parts by weight, for example about 0.5 to about 2 parts by weight, based on about 100 parts by weight of the polycarbonate resin (A), the rubber-modified aromatic vinyl copolymer (B), and the branched copolymer (C). When the amount of the metal particles is less than about 0.1 part by weight, it can be difficult to realize the metallic appearance. When the amount of the metal particles exceeds about 5 parts by weight, mechanical physical properties and molding processability can be significantly deteriorated.

The average particle size of the metal particles may be about 5 to about 100 μm, for example about 10 to about 60 μm. When the average particle size of the metal particles is less than about 5 μm or exceeds about 100 μm, it can be difficult to realize a metallic appearance, and the realization of excellent appearance properties can limited because the orientation or non-uniformity of the metal particles can be significant.

(E) Aromatic Vinyl Copolymer

The aromatic vinyl copolymer (E) used in the present disclosure is prepared by copolymerizing an aromatic vinyl compound and a vinyl compound that may be copolymerized with an aromatic vinyl compound.

Examples of the aromatic vinyl compound may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and mixtures thereof.

Examples of the vinyl compound that may be copolymerized with the aromatic vinyl compound may include without limitation acrylonitrile, methacrylonitrile, methacrylic acid alkyl esters, acrylic acid alkyl esters, maleic anhydride, alkyl and/or phenyl nucleus-substituted maleimide, and the like, and mixtures thereof. Herein, the term alkyl means $C_1$ to $C_8$ alkyl.

The aromatic vinyl copolymer (E) may be copolymerized from a mixture including about 60 to about 85 weight % of the aromatic vinyl compound and about 15 to about 40 weight % of the vinyl compound that may be copolymerized with the aromatic vinyl compound. In exemplary embodiments, the aromatic vinyl copolymer (E) may be copolymerized from a mixture including about 70 to about 80 weight % of the aromatic vinyl compound and about 20 to about 30 weight % of the vinyl compound that may be copolymerized with the aromatic vinyl compound.

The aromatic vinyl copolymer (E) may have a weight average molecular weight of about 50,000 to about 400,000 g/mol, for example about 80,000 to about 200,000 g/mol.

The aromatic vinyl copolymer (E) may include styrene-acrylonitrile copolymer (SAN).

The styrene-acrylonitrile copolymer (SAN) may be prepared by copolymerizing about 60 to about 85 weight % of styrene and about 15 to about 40 weight % of acrylonitrile, for example may be prepared by copolymerizing about 70 to about 80 weight % of styrene and about 20 to about 30 weight % of acrylonitrile.

The aromatic vinyl copolymer (E) may be included in the amount of 0 to about 30 parts by weight, for example about 1 to about 15 parts by weight, and as another example about 8 to about 12 parts by weight, based on about 100 parts by weight of the polycarbonate resin (A), the rubber-modified aromatic vinyl copolymer (B), and the branched copolymer (C). In some embodiments, the thermoplastic resin composition may comprise the aromatic vinyl copolymer (E) in an amount of 0 (the aromatic vinyl copolymer (E) is not present), about 0 (the aromatic vinyl copolymer (E) is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of aromatic vinyl copolymer (E) can be in a range from about any of the foregoing amounts to about any other of the foregoing amounts.

When within the amount of the aromatic vinyl copolymer (E) is within the above range, it can be effective to secure a balance of physical properties such as flowability, impact resistance and the like.

(F) Matting Agent

The matting agent (F) used in the present disclosure may be selectively included, and in this case, can be is effective to provide excellent gloss-reducing effect of the thermoplastic resin composition. However, the thermoplastic resin composition may exhibit excellent gloss-reducing effect even though the matting agent is not used or used in small amount.

The matting agent (F) may affect the surface of a molded article at the time of an injection molding to form a fine embossing surface, thereby inducing the scattering of light and exhibiting the gloss-reducing effect.

The matting agent (F) may be an inorganic compound and/or an organic compound. Examples of the inorganic compound may include without limitation silica, magnesium oxide, zirconia, alumina, titania, and the like, and combinations thereof. The organic compound may be a cross-linked vinyl copolymer wherein a monomer for the vinyl copolymer may be one or more monomers selected from the group consisting of styrene, acrylonitrile, methyl (meth)acrylate, ethyl (meth)acrylate, butyl (meth)acrylate, and the like.

In exemplary embodiments, a cross-linked styrene-acrylonitrile copolymer can be used as a matting agent.

The matting agent (F) may be included in an amount of 0 to about 10 parts by weight, for example about 1 to about 5 parts by weight, and as another example about 1 to about 2 parts by weight, based on about 100 parts by weight of the polycarbonate resin (A), the rubber-modified aromatic vinyl copolymer (B), and the branched copolymer (B). In some embodiments, the thermoplastic resin composition may comprise the matting agent (F) in an amount of 0 (the matting agent (F) is not present), about 0 (the matting agent (F) is present), 1, 2, 3, 4, 5, 6, 7, 8, 9, or 10 parts by weight. Further, according to some embodiments of the present invention, the amount of matting agent (F) can be in a range from about any of the foregoing amounts to about any other of the foregoing amounts.

When the matting agent (F) is included in an amount within the above range, it is possible to further improve gloss-reducing property. When the amount of the matting agent exceeds about 10 parts by weight, physical properties such as impact resistance, flowability and the like may be deteriorated.

Exemplary embodiments also provide a molded article including the thermoplastic resin composition that can have excellent appearance properties. For example, the thermoplastic resin composition including the branched copolymer may be used for various industrial fields, such as various electric electronic products, and automobile components, for example, for automobile interior materials.

The gloss of the molded product measured at an angle of 60° according to ASTM D523 may be about 20 to about 80 GU, for example about 30 to about 80 GU, and as another example about 40 to about 70 GU. It was confirmed through numerous tests that the thermoplastic resin composition of the present disclosure belonging to the relevant range can realize excellent physical properties and/or matting characteristics.

Furthermore, the molded article may have a ΔE value of about 3.0 or less, for example about 2.0 or less, and as another example about 1.0 to about 1.9, after exposure to 1,050 kJ/m² measured by the evaluation method according to SAE J 1885 or after exposure to 2,400 kJ/m² measured by the evaluation method according to FLTM BO 116-01 as an another evaluation method.

EXAMPLES

Hereinbelow are examples that include test results to prove the excellent effects of the thermoplastic resin composition of the present disclosure.

The specifications of the polycarbonate resin (A), rubber-modified aromatic vinyl copolymer (B), branched copolymer (C), metal particles (D), aromatic vinyl copolymer (E), and matting agent (F) used in Examples and Comparative Examples of the present disclosure are as follows.

(A) Polycarbonate Resin

In Examples and Comparative Examples of the present disclosure, a bisphenol-A type linear polycarbonate resin with the weight-average molecular weight of 25,000 g/mol is used.

(B) Rubber-modified Aromatic Vinyl Copolymer

The rubber-modified aromatic vinyl copolymers (B) used in Examples and Comparative Examples of the present disclosure are the following first rubber-modified aromatic vinyl copolymer (B-1), the following second rubber-modified aromatic vinyl copolymer (B-2), and the following third rubber-modified aromatic vinyl copolymer (B-3).

(B-1) First Rubber-modified Aromatic Vinyl Copolymer

As the first rubber-modified aromatic vinyl copolymer, the copolymer including a rubber polymer having an average particle size of about 7 µm prepared by a general mass polymerization process after mixing about 65 weight % of styrene and about 20 weight % of acrylonitrile with about 15 weight % of a polybutadiene rubber polymer, is used.

(B-2) Second Rubber-modified Aromatic Vinyl Copolymer

As the second rubber-modified aromatic vinyl copolymer, the copolymer including a rubber polymer having an average particle size of 1 µm prepared by a general mass polymerization process after mixing about 65 weight % of styrene and about 20 weight % of acrylonitrile with about 15 weight % of a polybutadiene rubber polymer, is used.

(B-3) Third Rubber-modified Aromatic Vinyl Copolymer

As the third rubber-modified aromatic vinyl copolymer, the grafted copolymer including a rubber polymer having an average particle size of 0.3 µm prepared by graft-copolymerizing through an emulsion polymerization process after mixing about 32 weight % of styrene and about 10 weight % of acrylonitrile with about 58 weight % of a polybutadiene rubber polymer, is used.

(C) Branched Copolymer

In Examples and Comparative Examples of the present disclosure, the branched copolymer having a weight average molecular weight of about 200,000 g/mol prepared by a general suspension polymerization method after mixing about 1 part by weight of a vinyl-modified dimethylsiloxane compound having about 0.5 mmol/g of vinylfunctional radical and about 2 parts by weight of 1,3,5,7-tetramethyl-1,3,5,7-tetravinyl-cyclotetrasiloxane, based on 100 parts by weight of the monomer mixture that includes about 76 weight % of styrene and about 24 weight % of acrylonitrile, is used.

(D) Metal Particles

In Examples and Comparative Examples of the present disclosure, aluminum metal particles having an average particle size of about 30 µm and a particle size distribution of about 15 to about 60 µm, which was purchased from Yamoto Metal Company, is used.

(E) Aromatic Vinyl Copolymer

As the aromatic vinyl copolymer used in Examples and Comparative Examples of the present disclosure, the styrene-acrylonitrile copolymer having a weight average molecular weight of about 150,000 g/mol prepared by a general suspension polymerization method using the monomer mixture including about 76 weight % of styrene and about 24 weight % of acrylonitrile, is used.

(F) Matting Agent

The matting agent used in Examples and Comparative Examples of the present disclosure is a BLENDEX BMAT product produced by Galata Chemicals Company.

Each of components according to the amount ratios shown in the following Table 1 is added and melt-mixed to produce a thermoplastic resin composition in the type of pellets. Additives, such as a thermal stabilizer, an antioxidant, a lubricant, a light stabilizer, a releasing agent, and dye/pigment may be further used. The extrusion is performed using a twin screw extruder with L/D=29 and the diameter of about 45 mm, and the barrel temperature is set to be about 250° C. The prepared pellets are dried at 80° C. for 2 hours. Then, using a 60 oz injection molder, the cylinder temperature and the molding temperature are set to be about 250° C. and about 60° C., respectively, and then, specimens for evaluating physical properties, such as the specimens for evaluating the degree of gloss and appearance, having the size of 90 mm×50 mm×2.0 mm are manufactured.

In the following Table 1, the amount units of polycarbonate resin (A), rubber-modified aromatic vinyl copolymer (B), and branched copolymer (C) are weight %, and the amount units of the metal particle (D), aromatic vinyl copolymer (E), and matting agent (F) are part by weight based on 100 parts by weight of the polycarbonate resin (A), rubber-modified aromatic vinyl copolymer (B), and branched copolymer (C).

TABLE 1

| | | Examples | | | | | | | | Comparative Examples | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| Polycarbonate resin (A) | | 65 | 65 | 65 | 65 | 72 | 72 | 50 | 75 | 65 | 76 | 76 | 87 | 76 | 87 | 71 | 88 |
| Vinyl-modified graft copolymer (B) | (B-1) | 20 | 20 | | | | | 20 | | 35 | 24 | | | 24 | | 29 | |
| | (B-2) | | | 20 | | | | | | | | 24 | | | | | |
| | (B-3) | | 5 | | 10 | 11 | 11 | | 10 | | | | 13 | | 13 | | 12 |
| Branched copolymer (C) | | 15 | 10 | 15 | 25 | 17 | 17 | 30 | 15 | | | | | | | | |
| Metal particles (D) | | 1 | 1 | 1 | 1 | 1 | 1 | 1 | 1 | 1 | 1 | 1 | 1 | 1 | 1 | 1 | 1 |
| Aromatic vinyl copolymer (E) | | | | | | 10 | 10 | | | 15 | 15 | 25 | 15 | | 25 | 30 | 15 |
| Matting agent (F) | | | | | | | 1.5 | | | | | | | 1.5 | 3 | | 1.5 |

The specimens obtained by the compositions of the aforementioned Table 1 are evaluated for the degree of gloss, impact resistance, flowability, weather resistance, and appearance as follows, and the results thereof are listed in the following Table 2.

Physical Property Evaluation Method (1) Degree of gloss (Gloss, GU): The degree of gloss is measured at the angle of 60° by an evaluation method according to ASTM D523 using a BYK-Gardner Gloss Meter produced by BYK.

(2) Impact resistance (kgf·cm/cm): For the specimen having a thickness of ⅛ for measurement of Izod impact strength, the notched Izod impact strength is measured by an evaluation method according to ASTM D256.

(3) Flowability (Melt-flow index, g/10 min): For the resin composition pellets, the flowability is measured under the conditions of 250° C. and 10 kg by an evaluation method according to ASTM D1238.

(4) Light resistance: The color difference change (ΔE) value is measured after the exposure of 2,400 kJ/m² by an evaluation method according to FLTM BO116-01 by Ford.

(5) Appearance: For the specimen for evaluating appearance, the degree of flow-mark, and the non-uniformity and orientation of the metal particles are evaluated with a naked eye, and then, the values are classified into 1 to 5 points (1: bad to 5: good).

TABLE 2

| Physical properties | Examples | | | | | | | | Comparative Examples | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| Degree of gloss | 55 | 59 | 62 | 62 | 68 | 61 | 42 | 67 | 59 | 71 | 82 | 90 | 65 | 68 | 72 | 79 |
| Impact resistance | 45 | 51 | 48 | 50 | 47 | 44 | 35 | 52 | 42 | 39 | 45 | 48 | 35 | 39 | 30 | 45 |
| Flowability | 43 | 41 | 46 | 41 | 46 | 43 | 51 | 37 | 38 | 45 | 49 | 50 | 40 | 43 | 52 | 38 |
| Light resistance | 1.0 | 1.3 | 1.1 | 1.9 | 1.5 | 1.6 | 1.0 | 1.7 | 2.4 | 1.1 | 2.1 | 3.3 | 1.0 | 2.2 | 1.2 | 1.9 |
| Appearance | 5 | 5 | 4 | 5 | 4 | 5 | 5 | 4 | 5 | 3 | 2 | 1 | 3 | 3 | 3 | 2 |

As shown in the above Table 2, it is confirmed that the thermoplastic resin compositions of Examples 1 to 8, including the branched copolymer (C) of the present disclosure all exhibit excellent matting properties, impact resistance, flowability, light stability, and appearance properties, but for Comparative Examples 1 to 8 without the branched copolymer (C), one or more properties of these physical properties is/are significantly reduced.

Therefore, the aforementioned tests prove that the aforementioned combination of components and amount ratios of the components according to the present disclosure can provide a composition with excellent mechanical properties such as impact resistance and the like, matting and appearance characteristics.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A thermoplastic resin composition comprising:
   (A) a polycarbonate resin;
   (B) a rubber-modified aromatic vinyl copolymer;
   (C) a branched copolymer that includes a silicon compound having two or more unsaturated radicals; and
   metal particles (D),
   wherein the branched copolymer (C) is prepared from a mixture including about 0.1 to about 10 parts by weight of the silicon compound having two or more unsaturated radicals (C-3) based on about 100 parts by weight of a monomer mixture comprising about 60 to about 85 weight% of an aromatic vinyl compound (C-1) and about 15 to about 40 weight% of an unsaturated nitrile compound (C-2).

2. The composition according to claim 1, wherein the silicon compound (C-3) is represented by the following Chemical Formula 1:

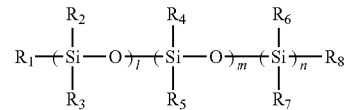

wherein each of l, m and n is the same or different and each is independently an integer of 0 to 100, with the proviso that l, m and n are not 0 at the same time;

each of $R_1$ to $R_8$ is the same or different and each is independently hydrogen, substituted or unsubstituted $C_1$ to $C_{30}$ alkyl, substituted or unsubstituted $C_2$ to $C_{30}$ alkenyl, substituted or unsubstituted $C_2$ to $C_{30}$ alkynyl, substituted or unsubstituted $C_3$ to $C_{30}$ cycloalkyl, substituted or unsubstituted $C_6$ to $C_{30}$ aryl, substituted or unsubstituted $C_1$ to $C_{30}$ heteroaryl, hydroxyl, alkoxyl, amino, epoxy, carboxyl, halogen, ester, isocyanate, or mercapto; with the proviso that at least two of $R_1$ to $R_8$ comprise an unsaturated radical that is capable of being polymerized; and wherein the compound has a linear or ring structure.

3. The composition according to claim 1, wherein the silicon compound (C-3) is represented by the following Chemical Formula 2:

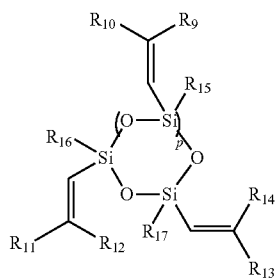

wherein each of $R_9$ to $R_{14}$ is the same or different and each is independently substituted or unsubstituted $C_1$ to $C_{20}$ alkyl, substituted or unsubstituted $C_2$ to $C_{20}$ alkenyl, or substituted or unsubstituted $C_6$ to $C_{20}$ aryl;

each of $R_{15}$ to $R_{17}$ is the same or different and each is independently hydrogen or substituted or unsubstituted $C_1$ to $C_6$ alkyl; and p is an integer of 1 to 6.

4. The composition according to claim 3, wherein the silicon compound (C-3) comprises 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a combination thereof.

5. The composition according to claim 3, wherein the branched copolymer (C) is produced by further adding a multifunctional vinyl compound comprising divinyl polydimethylsiloxane, vinyl-modified dimethylsiloxane, divinybenzene, ethylene glycol di(meth)acrylate, allyl(meth)acrylate, diallylphthalate, diallylmalate, triallylisocyanurate, or a combination thereof, to the mixture.

6. The composition according to claim 1, wherein the branched copolymer (C) is produced by further adding a multifunctional vinyl compound comprising divinybenzene, ethylene glycol di(meth)acrylate, allyl(meth)acrylate, diallylphthalate, diallylmalate, triallylisocyanurate, or a combination thereof, to the mixture.

7. The composition according to claim 1, wherein the aromatic vinyl compound (C-1) comprises styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, or a combination thereof.

8. The composition according to claim 1, wherein the unsaturated nitrile compound (C-2) comprises acrylonitrile, methacrylonitrile, fumaronitrile, or a combination thereof.

9. The composition according to claim 1, wherein the rubber-modified aromatic vinyl copolymer (B) includes a rubber polymer with an average particle size of about 0.1 to about 20 μm.

10. The composition according to claim 1, wherein the rubber-modified aromatic vinyl copolymer (B) includes about 10 to about 70 weight % of a rubber polymer.

11. The composition according to claim 1, wherein an average particle size of the metal particles (D) is about 5 to about 100 μm.

12. The composition according to claim 1, the composition further comprising at least one of an aromatic vinyl copolymer (E) and a matting agent (F).

13. The composition according to claim 12, comprising the aromatic vinyl copolymer (E) in an amount of 0 to about 30 parts by weight based on about 100 parts by weight of the polycarbonate resin (A), the rubber-modified aromatic vinyl copolymer (B), and the branched copolymer (C).

14. The composition according to claim 12, comprising the matting agent (F) in an amount of 0 to about 10 parts by weight based on about 100 parts by weight of the polycarbonate resin (A), the rubber-modified aromatic vinyl copolymer (B), and the branched copolymer (C).

15. The composition according to claim 1, comprising about 50 to about 85 Weight % of the polycarbonate resin (A), about 1 to about 40 weight % of the rubber-modified aromatic vinyl copolymer (B), and about 1 to about 30 weight % of the branched copolymer (C), each based on the total weight (100 weight %) of the polycarbonate resin (A), the rubber-modified aromatic vinyl copolymer (B), and the branched copolymer (C), and about 0.1 to about 5 parts by weight of the metal particles (D) based on about 100 parts by weight of the polycarbonate resin (A), the rubber-modified aromatic vinyl copolymer (B), and the branched copolymer (C).

16. A molded article produced from the thermoplastic resin composition according to claim 1.

17. The molded article according to claim 16, having a degree of gloss of about 20 to about 80 GU measured at an angle of 60° by an evaluation method according to ASTM D523.

18. The molded article according to claim 16, having a ΔE value of about 3.0 or less after exposure to 1,050 kJ/m² as measured by an evaluation method according to SAE J 1885 or after exposure to 2,400 kJ/m² as measured by an evaluation method according to FLTM BO 116-01.

* * * * *